B. F. SASSAMAN.
MEASURING INSTRUMENT.
APPLICATION FILED MAR. 30, 1911.
1,135,208.
Patented Apr. 13, 1915.
4 SHEETS—SHEET 3.
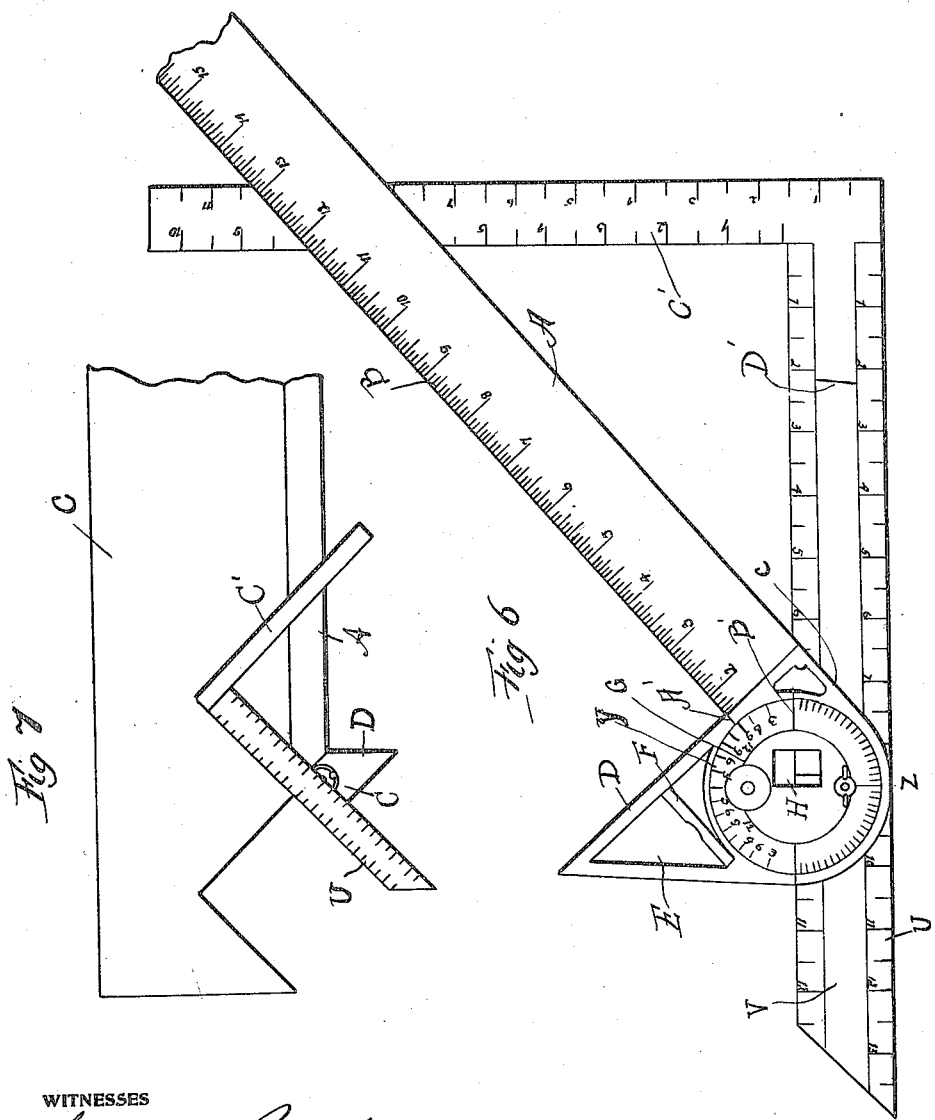

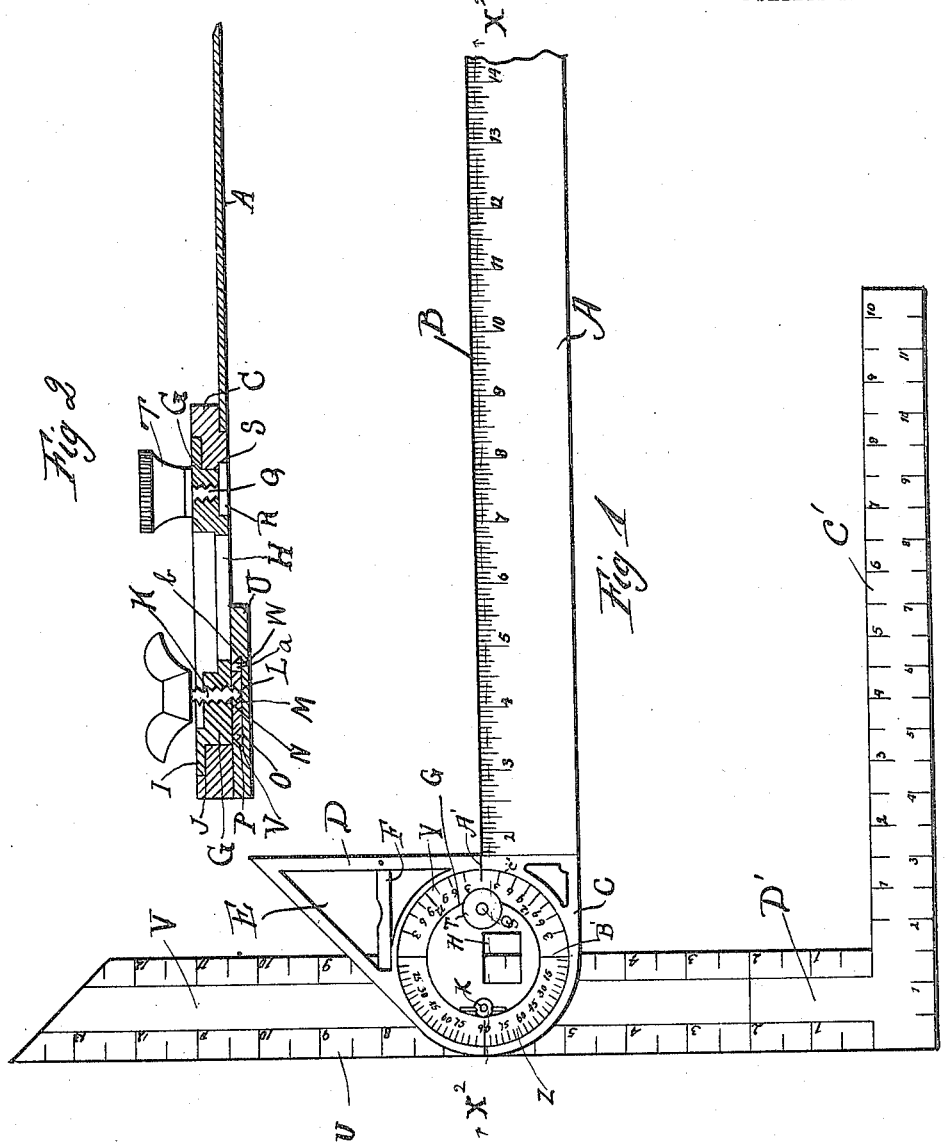

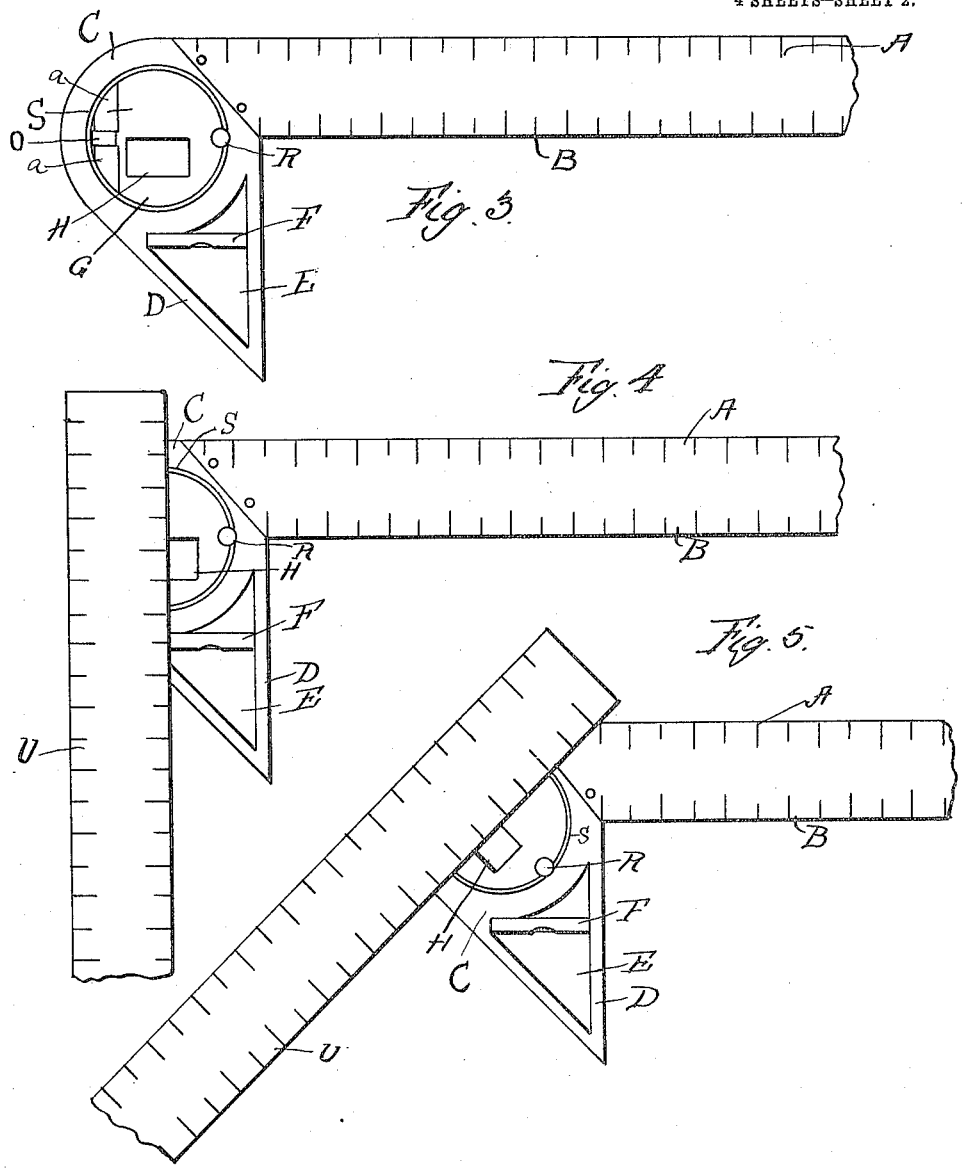

B. F. SASSAMAN.
MEASURING INSTRUMENT.
APPLICATION FILED MAR. 30, 1911.
1,135,208.
Patented Apr. 13, 1915.
4 SHEETS—SHEET 4.
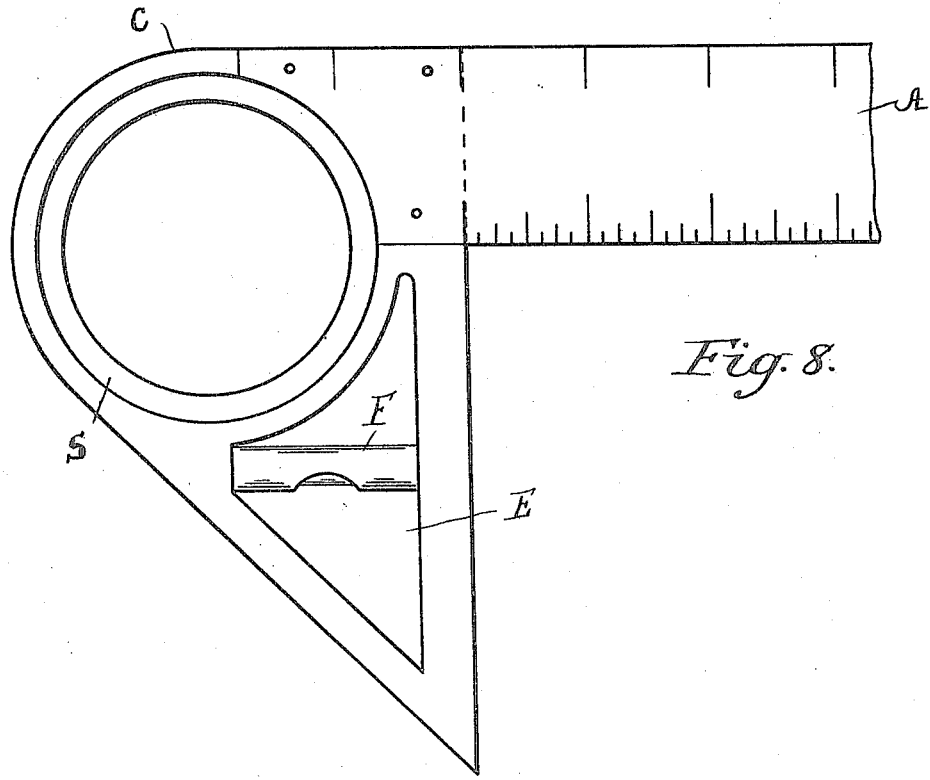
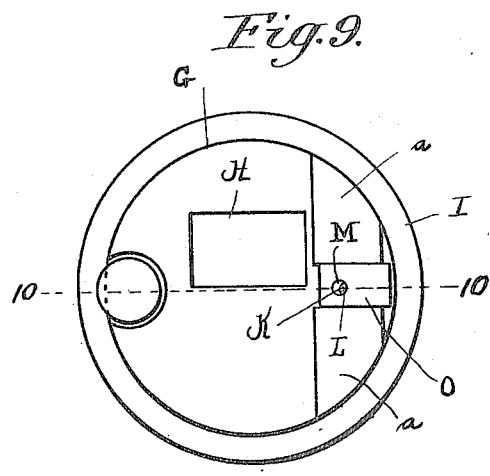
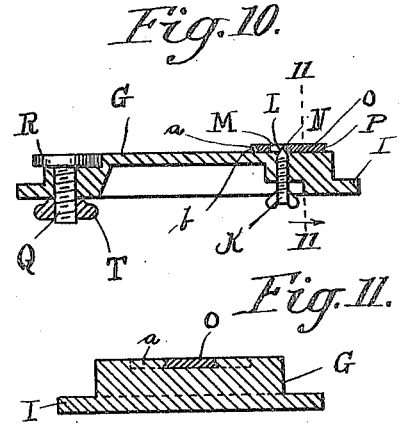
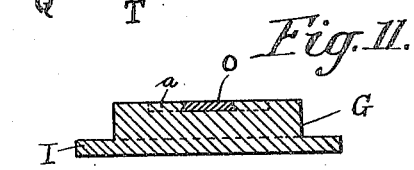
Witnesses
H. W. Burton
M. Tobias
Inventor
Benjamin F. Sassaman
By W. W. Williamson
Attorneys

UNITED STATES PATENT OFFICE.

BENJAMIN F. SASSAMAN, OF WEST CHESTER, PENNSYLVANIA.

MEASURING INSTRUMENT.

1,135,208. Specification of Letters Patent. Patented Apr. 13, 1915.

Application filed March 30, 1911. Serial No. 617,848.

*To all whom it may concern:*

Be it known that I, BENJAMIN F. SASSAMAN, a citizen of the United States, residing at West Chester, in the county of Chester and State of Pennsylvania, have invented a certain new and useful Improvement in Measuring Instruments, of which the following is a specification.

My invention relates to a new and useful improvement in measuring instruments, and has for its object to provide an exceedingly simple and effective device of this character which may be used for a variety of purposes such as a square, a T-square, a level, calipers, and can also be used in determining unknown measurements in geometrical figures when certain measurements are known.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1 is a plan view of my improvement showing a portion of one of the blades broken away. Fig. 2, a section at the line $x^2$—$x^2$ of Fig. 1. Fig. 3, an inverted plan view of the collar and its blade. Fig. 4, a similar view showing the head mounted thereon. Fig. 5, a similar view showing the head set at an angle other than a right angle. Fig. 6, a plan view showing the blade and its mountings connected to the head, said head having a projecting blade and used for marking stair horses, finding the hypotenuse of triangles and the like, and Fig. 7, shows the device in use in marking stair horses. Fig. 8 representing an enlarged reverse or bottom plan view of the head C, showing the blade A rigidly attached thereto. Fig. 9, is a similar view of the circular plate removed from the head. Fig. 10, is a section at the line 10—10 of Fig. 9; and Fig. 11, is a section at the line 11—11 of Fig. 10.

In carrying out my invention as here embodied, A represents a blade provided with graduations B, each inch of which is preferably divided into twelve sub-divisions.

The blade A is provided with a head C connected rigidly therewith and having an angular projection formed integral therewith provided with an opening E, in which is mounted a spirit level F, said level being parallel with the blade A so that when said blade is laid upon a surface the user may tell whether said surface is level or not.

Within the head C is revolubly mounted the circular plate G, provided with an aperture H, which is preferably rectangular in shape. The circular plate G has a flange I which rests in an annular groove J formed in the head C. The circular plate G is provided with a screw K which has a bevel end L adapted to engage the opening M, having a beveled wall N formed in the tightening member O, which is provided with a beveled edge P, said tightening member being dovetailed in the under side of the bridge *a*, the edges of which are beveled, as at *b*, said bridge being formed integral with the circular plate G. The circular plate G is provided with another screw Q having a head R which extends beyond the edge of the circular plate into an annular groove S formed in the under side of the head C. On this screw is threaded a circular nut T which will draw the head R of the screw Q against the surface of the head C, thereby tightening the head C and the circular plate with relation to one another.

The head blade U is provided with a groove V, the side walls W of which are beveled. This head blade slides upon the bridge *a* and when it is desired to hold it in any one place the screw K is threaded inward, the bevel end L of which operating against the bevel wall N of the hole M will cause the tightening member O to slide to one side, which will draw one of the beveled walls of the groove V against the bridge *a*, thus holding the head in the desired position.

The circular plate G is provided with a number of equal distance graduations Y, disposed as shown in the form of a semicircle, these representing the incline of the blade A in inches to the foot from the base plate, and also with graduations Z also in the form of a semi-circle representing degrees.

The head C is provided with an index mark A' which may be brought into register with somewhat similar markers B' upon the circular plate or with any of the graduations upon said circular plate. The index mark A' upon the head is in alinement with one edge of the blade A, as will be understood from Figs. 1 and 6.

C' is a projecting blade having an arm D' adapted to slide in the groove V formed in the head blade U. By sliding this blade C' in or out the end of the head blade U then calipers will be formed to be used upon small objects, but where calipers are needed for larger objects the inner edge of the blade C' may be used with the adjacent edge of the blade A, and by sliding the head blade U to one side, any distance within the limit of the head blade may be measured between the blades A and C'.

The operation of the device is as follows: It being understood that the head C being of greater thickness than the blade A, the edge of said head C with the blade forms a T-square. When the device is to be used as an ordinary square, the head blade U may be moved so that one end extends further than the other one beyond the edge of the blade A, and bringing an index mark in alinement with the index mark A', the head blade U will be at right angles to the blade A.

If the operator desires to determine the extent of a slant relatively to a vertical line, he places either edge of the head blade U against the line, and loosening the nut T swings the blade A to the proper inclination. He then notes the numerals upon the circular plate G, which indicates the number of inches of slant to the foot vertically. For instance the numeral 4 would mean that the line measured by the blade A inclines in a vertical space of one foot, a distance of four inches.

If the operator desires to find the hypotenuse of a triangle, knowing the other two sides, he moves the head blade U along until the numeral representing the length of one side appears in the aperture H, and when the graduation represented by this numeral is in alinement with the inner edge of this aperture, the blade A is swung around until the graduated edge is in alinement with the graduation upon the inner edge of the blade C', which indicates the length of the other side of the triangle, then the graduation of the scale B upon the blade A which registers with the given graduation on the inner edge of the blade C' will give the exact length of the hypothenuse of that triangle. In this manner the instrument is invaluable for workmen in constructing polygon buildings or objects.

To mark stair horses the operator will set the blades as shown in Figs. 6 and 7, then by resting the blade A against the edge of the plank c so that the head blade U and blade C' rest upon the face of said plank the correct lines may be had by marking by pencil along the outer edges of said head blade U and blade A.

It is needless to mention the many uses to which my device is applicable, as these uses will readily suggest themselves to persons skilled in this art.

Of course I do not wish to be limited to the exact details of construction here shown as these may be varied within the limits of the appended claim without departing from the spirit of my invention.

Having thus fully described my invention what I claim as new and useful, is—

A measuring instrument comprising a blade having a head provided with annular grooves, an angular projection formed integral with said head, said projection having an aperture formed therein, a spirit level mounted on said projection within said aperture, a circular plate having a flange adapted to rest within one of the annular grooves in the head and provided with a rectangular aperture for observation purposes, a screw having a head formed therewith said screw passing through the circular plate, a portion of its head resting within the other annular groove, a circular nut threaded on said screw for fixing the circular plate with respect to the blade, a bridge formed integral with the under side of the circular plate, a tightening member dove-tailed in said bridge, said tightening member having a beveled edge and provided with an opening, its side walls being beveled, a screw passing through the circular plate having a beveled end adapted to engage the opening in the tightening member, a head blade provided with a groove having beveled side walls, said head blade slidably mounted upon the bridge, a projecting blade, and an arm formed with said blade adapted to engage the groove in the head blade.

In testimony whereof, I have hereunto affixed my signature in the presence of two subscribing witnesses:

BENJAMIN F. SASSAMAN.

Witnesses:
W. H. TOMPKINS,
C. H. ANDREWS.

Copies of this patent may be obtained for five cents each, by addressing the "Commissioner of Patents, Washington, D. C."